United States Patent Office 3,190,721
Patented June 22, 1965

3,190,721
METHOD OF REMOVING IRON FROM SODIUM AND POTASSIUM SULFATES
Wilbur Simon, Crystal Lake, and George Andelfinger, Woodstock, Ill., assignors to Morton Salt Company, Chicago, Ill., a corporation of Delaware
No Drawing. Filed Feb. 23, 1962, Ser. No. 175,360
14 Claims. (Cl. 23—121)

This invention relates to improvements in the production of alkali metal sulfates, and more particularly to a process for upgrading crude alkali metal sulfates to produce an improved product.

Alkali metal sulfates are utilized for a variety of purposes in the chemical industries. For example, sodium sulfate or salt cake, as it is often termed, is used in the ceramic and glass making industries, which require a product of very low iron content. The kraft paper industry demands a sodium sulfate that has a white or light color.

One important process for the production of alkali metal sulfates is the well known Hargreaves process. This process involves passing sulfur dioxide, water vapor, and oxygen gases at elevated temperatures through alkali metal chlorides that have been briquetted with a small amount of iron catalyst. Although this process is successful, it produces a product which has several disadvantages. One disadvantage is the inclusion of iron as an impurity which causes a pink to red coloration. Another drawback is that the material tends to become "dusty" after grinding, and finally, calcium sulfate is also present as an impurity which further detracts from the quality of the substance. Alkali metal sulfates produced by the Mannheim process have similar drawbacks.

The crude alkali metal sulfates as are produced by the Hargreaves and Mannheim processes contain iron compounds which may be present in amounts of from 0.3 to 0.4 percent iron expressed as $Fe_2O_3$. Calcium sulfate is likewise present in these crude alkali metal sulfates in amounts of from 1.0 to 1.5 percent expressed as calcium sulfate.

The entrained iron oxide contributes a pink to red color to the salt cake which detracts from its salability where a white product is desired and precludes the salability where a white product is necessary. The calcium sulfate impurity presents a water solubility problem and tends to precipitate from solution and form a sludge. Furthermore, grinding of the salt cake from the Hargreaves and Mannheim processes yields a product which has a high proportion of "dust," which is material of such fineness that it passes through a 325 mesh screen. The presence of an inordinate amount of such fine particle size matter poses problems in packing, handling, processing, and manufacturing relative to the health of personnel and also with respect to plant cleanliness, such that considerable inconvenience and expense are incurred in the use of such material.

Inasmuch as the crude alkali metal sulfate products, such as those of Hargreaves and Mannheim, contain undesirable impurities as outlined in the foregoing discussion, it would be desirable to provide a method of upgrading and improving such materials.

Accordingly it is one object of the present invention to provide a process for upgrading crude alkali metal sulfates produced by the Hargreaves and Mannheim processes by the removal of iron and calcium compounds therefrom.

A further object is the provision of a process for upgrading crude alkali metal sulfates containing iron alone, wherein the resulting product has a reduced iron content.

A still further object is the provision of a process for upgrading crude alkali metal sulfates wherein the resulting product has a reduced iron and calcium content, and is essentially white in color.

A still further object is the provision of a process for upgrading crude alkali metal sulfates to produce a product that is relatively free of fine dust-like particles, and has a more desirable particle size distribution.

The fulfillment of these and other objects of this invention may be more readily appreciated by reference to the following specification, examples and appended claims.

Accordingly, in one broad form, the present invention is directed to a process for producing alkali metal sulfates of reduced iron content and improved color, said process comprising fusing a crude alkali metal sulfate containing iron impurities with an alkaline material in the presence of a siliceous material, and thereafter separating the fused sulfate from the resulting siliceous residue containing iron impurities.

The process of this invention is also applicable to crude alkali metal sulfates which contain both iron and calcium impurities to produce an upgraded alkali metal sulfate having both a reduced iron and calcium content.

The process of the present invention is applicable to crude alkali metal sulfates of the type previously described, such as those of the Hargreaves and Mannheim processes, and more particularly, to crude sodium and potassium sulfates. The crude sulfates which may be upgraded by the process of this invention contain iron compounds in amounts of from 0.2 to about 3 weight percent, although from 0.3 to 0.5 weight percent is more common. The weight percent of iron is calculated on the basis of $Fe_2O_3$ or ferric oxide. Calcium, when present in the crude alkali metal sulfate starting material, is usually in an amount of from about 0.5 to about 3.0 weight percent, and more commonly from 0.75 to about 2.0 weight percent, said percentages calculated as $CaSO_4$ or calcium sulfate. The crude product, prior to treatment, is usually pink in color, although the color can range, depending upon the proportion of ferric oxide present, from red to yellowish or orange.

The alkaline materials utilized in this process are in the broadest instance derived from alkali or alkaline earth metals, preferably sodium, potassium, and calcium. These alkaline materials are preferably in the form of oxides, hydroxides, or carbonates. Exemplary of these materials are sodium hydroxide, sodium carbonate, calcium oxide, potassium hydroxide, calcium carbonate, calcium hydroxide, and potassium carbonate. When the crude sulfate treated is sodium, alkaline material of corresponding cation (sodium) should preferably be utilized to reduce contamination. Likewise, in those instances where calcium is an undesirable impurity in the final product, the alkaline material should not be a calcium compound, since this would introduce a deleterious impurity into the product. The amount of alkaline material or substance may vary, and broadly at least about 0.4 percent is added. While the upper limit is not critical, generally 3.0 weight percent is satisfactory for the type of crude sulfates described above. A preferred range of alkali is 0.5 to 2.0 percent.

The present process is carried out by fusion of the crude sulfate with alkali in the presence of a siliceous material. Thus the fusion may be carried out in a confined zone, as for example, in a suitable crucible. Crucibles of quartz, porcelain, ceramic, or metal are suitable. The fusion is broadly carried out at temperatures above about 1650° F., and while higher temperatures below decomposition conditions are not deleterious, temperatures above about 2400° F. are not advantageous from an economic viewpoint. Ordinarily, fusion is complete at about 1800 to 2200° F. for the sodium and potassium sulfate, respectively. It should be understood that the process is not limited to any particular fusion temperature, the particular object being accomplished when the product is in the liquefied condition.

The siliceous material utilized may be in the form of sand, silicon dioxide, sodium silicate or siliceous minerals which contain a high proportion of silica. The amount of siliceous material is not critical. Generally, from about 0.5 to 4 weight percent of siliceous material is adequate, and in the preferred instance from 0.5 to 2 weight percent. It should be understood that the use of larger amounts of siliceous material does not adversely affect the process, but is uneconomic.

In the procedure utilized in the practice of the process of the invention, a crude alkali metal sulfate containing iron, and in some instances calcium impurities, is introduced into a fusion vessel together with an alkali and a siliceous material, and the composition heated to fusion. Stirring may accompany the process to insure adequate admixing. The fused sulfate bath is then decanted from the siliceous residue which contains iron and calcium impurities when the latter is present. The said siliceous residue, being heavier than the molten reaction mixture, sinks to the bottom of the fusion vessel. The fused sulfate recovered from the process is then cooled to the solid state and preferably comminuted to a granular finely divided product.

For a more complete understanding of the process of this invention, reference is made to the following specific examples.

EXAMPLE 1

One hundred grams of pink, crude salt cake (sodium sulfate) containing 0.34 weight percent iron expressed as $Fe_2O_3$, and 1.08 percent calcium expressed as $CaSO_4$, were fused with 1.0 gram of sodium carbonate and 1.0 gram of sand in a porcelain crucible at 1800° F. until the reaction mixture was in a liquid state. The molten salt cake was decanted from the resulting siliceous residue containing iron and calcium impurities. The fused sodium sulfate was cooled, ground, and analyzed for impurities. The following is a comparison of the initial and final product.

|  | Crude $Na_2SO_4$ | Upgraded $Na_2SO_4$ |
|---|---|---|
| Iron content (calculated as $Fe_2O_3$) | 0.34 | 0.008 |
| Calcium content (Calculated as $CaSO_4$) | 1.08 | 0.12 |
| Color | Pink | White |

EXAMPLE 2

One hundred grams of crude pink potassium sulfate ($K_2SO_4$) containing 0.40 percent iron expressed as $Fe_2O_3$ were fused with 1.0 gram of potassium carbonate and 1.0 gram of sand at a temperature of 2200° F. The fused sulfate was decanted from the siliceous residue, cooled and comminuted as described in Example 1. The resulting product was white in color, and had an iron content, expressed as $Fe_2O_3$ of 0.01 percent.

EXAMPLE 3

The procedure of Example 1 was repeated, using however as additives 1.0 gram of sodium hydroxide as alkali and 2.0 grams of sand as siliceous material. The following results were obtained.

|  | Crude $Na_2SO_4$ | Upgraded $Na_2SO_4$ |
|---|---|---|
| Iron content (as $Fe_2O_3$) | 0.335 | 0.005 |
| Calcium content (as $CaSO_4$) | 1.08 | 0.69 |
| Color | Pink | White |

As indicated above in those instances where calcium contamination of iron containing crude alkali metal sulfates is not a problem, the alkaline material utilized may be selected broadly from the class of alkali and alkaline earth metal oxides, hydroxides and carbonates, thereby including alkaline calcium compounds. In the more specific aspects, those derived from sodium, potassium and calcium are the most preferred. The following example will illustrate the reduction of iron using a calcium derived alkaline material in conjunction with a siliceous material.

EXAMPLE 4

To one hundred grams of a crude pink sodium sulfate containing 0.34 percent iron (calculated as ferric oxide) was added 1.0 gram of calcium oxide and 2.0 grams of sand. The mixture was fused at about 1800° F. and the body of the molten sulfate decanted from the siliceous residue containing essentially all the iron impurity. The product was cooled and ground as described in Example 1. The following results were obtained:

|  | Crude $Na_2SO_4$ | Upgraded $Na_2SO_4$ |
|---|---|---|
| Iron (as $Fe_2O_3$) | 0.34 | 0.009 |
| Calcium (as $CaSO_4$) | 1.08 | 1.73 |
| Color | Pink | White |

EXAMPLE 5

The process of Example 4 was repeated, using however a mixture of alkaline materials in conjunction with the siliceous material in the following proportions:

| | Grams |
|---|---|
| NaOH | 1.0 |
| CaO | 1.0 |
| Sand | 2.0 |

|  | Crude $Na_2SO_4$ | Upgraded $Na_2SO_4$ |
|---|---|---|
| Iron (as $Fe_2O_3$) | 0.41 | 0.014 |
| Calcium (as $CaSO_4$) | 1.45 | 0.92 |
| Color | Pink | White |

It will be noted that in this example, using mixed alkalies, there was some reduction of calcium content in conjunction with substantial reduction of iron.

To illustrate the decrease in fines or dust, a typical product produced by the process of this invention was analyzed for particle size distribution. A typical crude crushed salt cake was also analyzed for purposes of comparison. The following results were obtained:

*Effect of fusion on particle size*

Particle size distribution, crude salt cake:
Retained on— Percent
    40 mesh _____ 11.0
    60 mesh _____ 10.04
    80 mesh _____ 6.8
    100 mesh _____ 4.5
    200 mesh _____ 15.5
    325 mesh _____ 16.4
    Through 325 mesh _____ 35.1
Particle size distribution, salt cake upgraded by fusion:
Retained on— Percent
    40 mesh _____ 0.04
    60 mesh _____ 0.04
    80 mesh _____ 0.04
    100 mesh _____ 7.3
    200 mesh _____ 78.0
    325 mesh _____ 16.8
    Through 325 mesh _____ 5.7

From the above it may be seen that the product of the present invention has a considerably improved particle size distribution, and particularly has a lower fines content, as is indicated by the substantially smaller amount of material passing a 325 mesh screen (U.S. Standard screen scale). It should be particularly noted that about 85.42 percent of the product is retained on a 200 mesh screen, whereas in the crude salt cake only 47.8 percent is retained on a 200 mesh screen and that the particle size distribution is over a substantially narrower range.

The foregoing examples illustrate that the process of this invention applied to crude alkali metal sulfates, such as those of the Hargreaves and Mannheim processes, results in a product which has a substantially reduced iron content. As may be seen in the foregoing examples, the reduction in iron with concomitant upgrading of the salt cake or potassium sulfate may be accomplished by the use of alkaline materials of the type described, including calcium. Where it is desired to produce a sodium or potassium sulfate having both a reduced iron and calcium content, the alkaline material utilized is selected from compounds derived from sodium and potassium.

The foregoing examples illustrate that using the process of the present invention, the iron content of crude alkali metal sulfates is very substantially reduced. Thus in the specific examples the reduction in iron content ranges from about 93 percent to about 99 percent. Likewise, the reduction of the calcium content as concomitantly carried out by the modified procedures described above produces an improved product.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

We claim:

1. A process for upgrading crude sulfates which comprises fusing a crude sulfate selected from the group consisting of sodium and potassium sulfate and containing iron compounds in an amount of from 0.2 to 3.0 weight percent expressed as ferric oxide as an impurity, with an alkaline material in the presence of a siliceous material, and thereafter separating the fused sulfate from the resulting siliceous residue containing iron impurities.

2. The process of claim 1 wherein the alkaline material is selected from the group consisting of sodium, potassium and calcium, oxides, hydroxides and carbonates.

3. The process of claim 2 wherein the alkaline material is present in an amount of from 0.4 to 3.0 weight percent.

4. The process of claim 1 wherein the siliceous material is sand.

5. The process of claim 1 wherein the siliceous material is present in an amount of from 0.5 to 4.0 weight percent.

6. A process for upgrading crude alkali sulfates which comprises fusing a crude sulfate selected from the group of sodium and potassium sulfates, containing as impurities iron in an amount of from 0.2 to 3.0 weight percent expressed as ferric oxide and calcium in an amount of from 0.5 to 3.0 weight percent expressed as calcium sulfate and from 0.4 to 3.0 weight percent of an alkaline material selected from the group consisting of sodium and potassium, oxides, hydroxides and carbonates, and contacting said fused sulfate with a siliceous material.

7. A process according to claim 6 wherein the sulfate and alkaline material are derived from sodium.

8. A process according to claim 6 wherein the siliceous material is present in an amount of from 0.5 to 4.0 weight percent.

9. A process for upgrading crude sulfates which comprises fusing a crude alkali metal sulfate selected from the group consisting of sodium and potassium sulfate, containing iron in an amount of from 0.2 to 3.0 percent by weight expressed as ferric oxide and calcium in an amount of from 0.5 to 3.0 percent by weight expressed as calcium sulfate with an alkaline material selected from the group consisting of sodium and potassium, oxides, hydroxides and carbonates, in an amount of from 0.4 to 3.0 weight percent in the presence of from 0.5 to 4 weight percent of a siliceous material selected from the group consisting of sand, silicon dioxide, sodium silicate and potassium silicate, separating the fused sulfate from the resulting siliceous residue containing iron and calcium impurities, cooling the fused sulfate to a solid state and comminuting the solidified product.

10. The process of claim 9 wherein the sulfate is sodium sulfate.

11. The process of claim 9 wherein the sulfate is potassium sulfate.

12. The process of claim 9, wherein the siliceous material is sand.

13. A process comprising fusing a crude sodium sulfate containing from 0.3 to 0.5 weight percent iron expressed as ferric oxide and from 0.75 to 2.0 weight percent calcium expressed as calcium sulfate with from 0.5 to 2.0 weight percent of an alkaline sodium compound selected from the group consisting of sodium hydroxide and sodium carbonate in the presence of from 0.5 to 4 weight percent of a siliceous material selected from the group consisting of sand, silicon dioxide, sodium silicate and potassium silicate and decanting the fused sodium sulfate from the resulting siliceous residue containing iron and calcium impurities, and cooling said fused sulfate to a solid state and comminuting the solidified product.

14. A process comprising fusing a crude potassium sulfate containing from 0.3 to 0.5 percent iron calculated as ferric oxide with from 0.5 to 2.0 weight percent of an alkaline potassium compound in the presence of a siliceous material, decanting the fused sulfate from the resulting siliceous residue containing iron and calcium impurities, cooling the fused potassium sulfate to a solid state, and comminuting the solidified product.

References Cited by the Examiner

UNITED STATES PATENTS 2,860,951  11/58  Cunningham _____ 23—121 X
3,006,726  10/61  Simon _____ 23—121

MAURICE A. BRINDISI, Primary Examiner.
GEORGE D. MITCHELL, Examiner.